(12) United States Patent
Runkel

(10) Patent No.: US 8,151,953 B2
(45) Date of Patent: Apr. 10, 2012

(54) SUSPENSION AND DAMPING DEVICE FOR MOTOR VEHICLES

(75) Inventor: Walter Runkel, Keubsdorf/Rhein (DE)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 12/708,804

(22) Filed: Feb. 19, 2010

(65) Prior Publication Data

US 2010/0140884 A1    Jun. 10, 2010

Related U.S. Application Data

(62) Division of application No. 11/242,363, filed on Oct. 3, 2005, now abandoned.

(60) Provisional application No. 60/668,733, filed on Apr. 6, 2005.

(30) Foreign Application Priority Data

Apr. 8, 2004    (DE) ...................... 20 2004 005 623 U

(51) Int. Cl.
*F16F 9/24* (2006.01)

(52) U.S. Cl. ..................................... 188/314; 267/64.15

(58) Field of Classification Search .................. 188/314, 188/313; 267/64.15, 64.16, 218
See application file for complete search history.

(56) References Cited

U.S. PATENT DOCUMENTS

| | | | |
|---|---|---|---|
| 1,116,293 A | 11/1914 | Kane | |
| 1,290,293 A | 1/1919 | Morski | |
| 1,397,879 A | 11/1921 | Pillmore | |
| 1,470,931 A | 10/1923 | Perkins | |
| 1,493,884 A | 5/1924 | Kreider | |
| 1,500,277 A | 7/1924 | Selker | |
| 2,038,032 A | 4/1936 | Flynn | |
| 2,706,009 A | 4/1955 | Schramm | |
| 3,085,796 A | 4/1963 | Wettstein | |
| 3,285,617 A | 11/1966 | Jackson | |
| 3,677,141 A | 7/1972 | Lagerqvist et al. | |
| 3,689,103 A | 9/1972 | Meulendyk | |
| 3,840,245 A | 10/1974 | Aikawa et al. | |
| 3,921,746 A | 11/1975 | Lewus | |
| 4,091,897 A | 5/1978 | Andrepont | |
| 4,159,756 A | 7/1979 | Murakami et al. | |
| 4,732,244 A | 3/1988 | Verkuylen | |
| 5,009,451 A | 4/1991 | Hayashi et al. | |

(Continued)

FOREIGN PATENT DOCUMENTS

BE    375994    1/1931

(Continued)

*Primary Examiner* — Bradley King
(74) *Attorney, Agent, or Firm* — Brinks Hofer Gilson & Lione

(57) ABSTRACT

The invention relates to a suspension and damping device (1) for load bearing and sprung wheel support and for damping suspension movements in a motor vehicle, having at least one spring cylinder (2) having a piston (6) which is guided in a cylinder (4) so as to be movable relative to the cylinder and which acts counter to an elastically compressible spring medium (FM) in order to generate a load bearing supporting spring force (F). A separate circuit of a hydraulic damping medium (DM) which is independent of the spring medium (FM) is provided for damping. The piston (6) separates two working chambers (10, 12) from one another within the cylinder (4). One working chamber (10) is assigned to the spring medium (FM) and the other working chamber (12) is assigned to the damping medium (DM).

4 Claims, 8 Drawing Sheets

U.S. PATENT DOCUMENTS

| | | | |
|---|---|---|---|
| 5,094,325 A | 3/1992 | Smith | |
| 5,219,152 A | 6/1993 | Derrien et al. | |
| 5,246,247 A | 9/1993 | Runkel | |
| 5,413,030 A | 5/1995 | Richardson et al. | |
| 5,624,105 A * | 4/1997 | Runkel | 267/64.15 |
| 6,131,709 A | 10/2000 | Jolly et al. | |
| 6,142,495 A | 11/2000 | Kim | |
| 6,161,853 A | 12/2000 | Jung | |
| 6,213,261 B1 | 4/2001 | Kunkel | |
| 7,766,136 B2 * | 8/2010 | Runkel | 188/297 |
| 2002/0109327 A1 | 8/2002 | Timoney et al. | |

FOREIGN PATENT DOCUMENTS

| | | |
|---|---|---|
| DE | 1802193 | 8/1970 |
| DE | 3027124 | 2/1981 |
| DE | 3902743 C1 | 7/1990 |
| EP | 0529320 A1 | 3/1993 |
| EP | 0425885 B1 | 7/1994 |
| EP | 0677679 | 7/1998 |
| EP | 0980772 | 2/2000 |
| EP | 1231085 A2 | 8/2002 |
| JP | 62-64603 | 3/1987 |
| WO | WO 03/106202 A1 | 12/2003 |

\* cited by examiner

SUSPENSION AND DAMPING DEVICE FOR MOTOR VEHICLES

CROSS REFERENCE TO RELATED APPLICATION

This application is a divisional application of and claims priority to U.S. patent application Ser. No. 11/242,363, filed Oct. 3, 2005, which claims priority to German patent application 20 2004 005 623.2, filed Apr. 8, 2004 and U.S. provisional patent application 60/668,733, filed Apr. 6, 2005.

FIELD OF THE INVENTION

The present invention relates to a suspension and damping device for load bearing and sprung wheel support and for damping suspension movements in a motor vehicle. More specifically, the invention includes at least one spring cylinder having a piston which is guided in a cylinder so as to be movable relative to said cylinder and which acts counter to an elastically compressible spring medium in order to generate a load bearing supporting spring force, a separate circuit of a hydraulic damping medium which is independent of the spring medium being provided for damping.

BACKGROUND OF THE INVENTION

WO 03/106202 A1 describes a suspension device of the general type of the present invention including a damping device having a separate circuit of a hydraulic damping medium which is independent of the spring cylinder and the spring medium. For this purpose, at least one separate damping cylinder having a damper piston which is guided in a cylinder so as to be movable in the cylinder is required, as well as at least one damping valve which is connected hydraulically to the damper cylinder. The piston of the spring cylinder is driven via a drive device which is formed by a gear mechanism which converts the pivoting movements of a wheel strut supporting arm into the linear relative movements between the cylinder and the piston of the spring cylinder. Here, the damping device is to interact with the same drive device as the spring cylinder, the media (spring and damping medium) being completely separate from one another. A reason for this is that the system provides thermal independence as a result, and therefore damping-induced heating of the damping medium is not critical to the extent that the temperature of the spring medium and thus also the pressure and the pressure-dependent supporting spring force remain unaffected by such heating. In contrast to this, heating of the spring medium would also bring about a change in the pressure and thus in the supporting spring force. The known suspension and damping device has a relatively complicated construction, however, which also becomes apparent by a relatively large installation volume and weight.

Furthermore, customary telescopic spring cylinders are also known, often also referred to as "spring struts", which are mounted directly between the wheel or wheel strut and the vehicle frame. In the case of a hydropneumatic design of spring struts of this type, a hydraulic medium is displaced on one side against a compressible medium, and at the same time this hydraulic flow is also guided via an integrated damping valve. However, the hydraulic medium is heated rapidly and to a certain extent severely as a result of the damping (throttling). This heating has an effect on the compressible, in particular pneumatic medium, in that the pressure of the latter and thus also the supporting spring force rise. Unfavorable, widely varying suspension and damping properties result from this thermal effect.

SUMMARY OF THE INVENTION

The present invention is based on the object of providing a suspension and damping device of the generic type previously described, which device is distinguished by optimum suspension and damping properties with a particularly compact and simple overall form.

In accordance with the invention, there is provision for the piston to separate two working chambers from one another within the cylinder, the first working chamber being assigned to the spring medium and the second working chamber being assigned to the damping medium. The spring cylinder according to the invention is thus in principle a type of spring strut in the conventional sense, a hydraulic damping circuit being separated, however, from the spring medium via the piston.

BRIEF DESCRIPTION OF THE DRAWINGS

In the following text, the invention is to be explained in greater detail using a plurality of preferred exemplary embodiments which are shown in the drawing, in which, in each case in diagrammatic, partially axially sectioned outline illustrations.

DETAILED DESCRIPTION OF THE INVENTION

Figure 1:
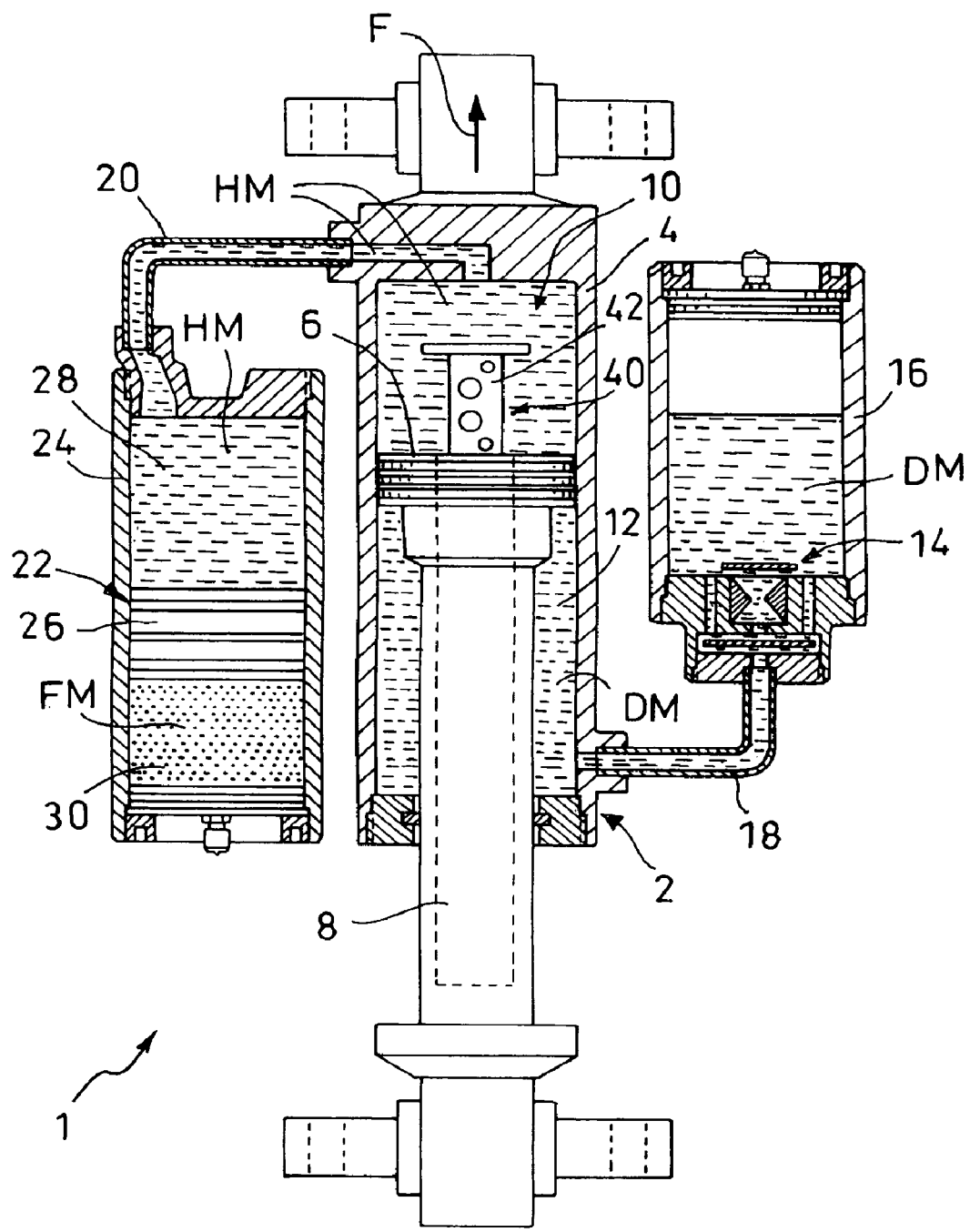
FIG. 1 shows a first embodiment of a suspension and damping device according to the invention.

In the different figures of the drawing, parts and components which are identical or which correspond to one another in functional terms are provided with the same number designations. Every description of a part which refers to one or more specified figures of the drawing thus also applies analogously with regard to the other figures of the drawing in which the part with the corresponding designation can likewise be seen.

In all the exemplary embodiments, a suspension and damping device 1 according to the invention comprises (at least) one spring cylinder assembly 2 which is provided for the direct arrangement between a vehicle wheel or a wheel strut supporting arm and a vehicle frame (neither of which is shown). In a telescopic manner, the spring cylinder assembly 2 comprises a cylinder 4 and a piston 6 which is guided so as to be displaceable linearly therein and has a piston rod 8 which is guided out of the cylinder 4 such that it is circumferentially sealed.

In order to produce a load bearing supporting spring force F, the piston 6 acts indirectly (for example, FIGS. 1 to 6) or directly (for example, FIGS. 7 to 10) counter to an elastically compressible spring medium FM. For the damping of suspension movements, a separate circuit of a hydraulic damping medium DM which is independent of the spring medium FM is provided.

The piston 6 is in contact with the inner surface of the cylinder 4 via at least one annular piston seal. As a result, the piston 6 separates two working chambers from one another within the cylinder 4, a first working chamber 10 being assigned to the spring medium FM and a second working chamber 12 being assigned to the damping medium DM. As a consequence, according to the invention, the piston 6 also separates a "spring circuit" in which spring medium FM flows from a "damping circuit" in which damping medium DM flows.

The spring cylinder assembly 2 is configured as a pressure cylinder in the preferred exemplary embodiment shown. This means that it acts in practice as a compression spring, in order to support the respective load. For this purpose, the first working chamber 10 which is assigned to the spring medium FM is formed as a cylindrical chamber on that side of the piston 6 which lies opposite the piston rod 8. The second working chamber 12 encloses the piston rod 8 annularly or hollow cylindrically. As the second working chamber 12 is assigned to the damping medium DM according to the invention, the piston rod 8 advantageously acts in this refinement as a cooling element for cooling the damping medium DM which is heated during damping or throttling.

The second working chamber 12 is connected to a hydraulic reservoir or container 16 via a damping valve arrangement 14. The damping valve arrangement 14 is preferably arranged in an integrated manner in an inlet region of the hydraulic container 16. The hydraulic container 16 is preferably arranged externally as a separate component, separated from the spring cylinder assembly 2, and is connected to the second working chamber 12 of the spring chamber 30 via a line 18. Damping or throttling induced heating of the damping medium DM is advantageously produced in a region which is remote from the spring cylinder assembly 2 and thus also remote from the spring medium FM, in that the damping valve arrangement 14 is arranged in an integrated manner in the inlet region of the hydraulic container 16. In addition, an additional cooling action for cooling the damping medium DM is advantageously also achieved by the external hydraulic container 16, in that heat is emitted to the surroundings via a large outer surface (cooling surface). Although a heat component can also pass into the second working chamber 12 via the damping medium DM, the piston rod 8 acts as a cooling element, as has already been indicated above, in that it is enclosed by the damping medium DM and as a result transports its warmth to the outside. This is particularly effective because it is true that the piston rod also partly moves out of the cylinder 4 during the suspension movements and is able to conduct any heat to the surroundings there. It can be said that the piston rod 8 forms a type of "heat exchanger". In addition, heat is also emitted to the surroundings via the outer surface of the cylinder 4. The arrangement according to the invention thus uses very large cooling surfaces overall for the effective cooling of the damping medium DM, with the result that a transfer of heat to the spring medium via the piston 6 is advantageously at most very small.

In addition, a damping operation is performed in the preferred refinements only during half the suspension cycle, to be precise by an appropriate configuration of the damping valve arrangement 14 (with restrictor valves and nonreturn valves) only during rebound, while compression movements are virtually undamped, with the result that heat is actually produced only during rebound. The compression stroke can be used for cooling. During compression, hydraulic damping can be dispensed with, because the spring medium FM then acts in a quasi-damping manner by virtue of a rising spring characteristic diagram.

The hydraulic container 16 is preferably arranged in a vehicle in such a way that it is arranged approximately parallel next to the spring cylinder assembly 2, to be precise in such a way that the damping medium DM is situated in the lower region as a result of gravity. The volume above the damping medium DM can be vented to atmosphere. However, there can also be provision for this space above the damping medium DM to be placed under a defined initial pressure of, for example, from 3 to 5 bar, in order to assist (to accelerate) the flow of damping medium into the second working chamber 12 during compression.

Figure 11:
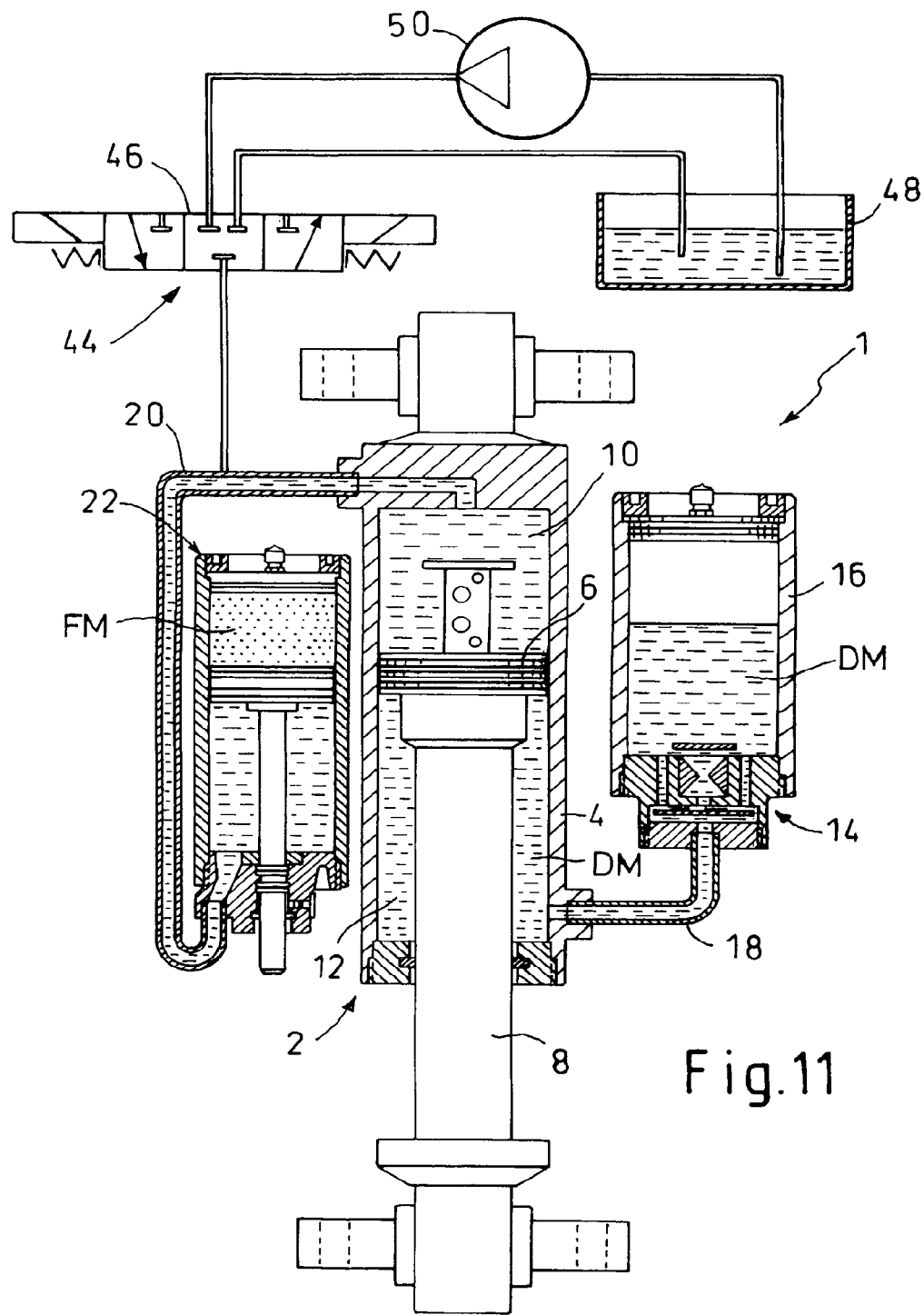
FIG. 11 shows an advantageous refinement of the invention using the example of the refinement according to FIGS. 4 to 6.

In the embodiments according to FIGS. 1 to 6 and also according to FIG. 11, the first working chamber 10 is connected via a line 20 to a spring force accumulator 22 which contains the elastically compressible spring medium FM. Spring force accumulator 22 is preferably configured as a hydropneumatic piston accumulator having a separating piston 26 which can move freely (in a floating manner) in an accumulator cylinder 24. The separating piston 26 is in sealing contact with the inner surface of the accumulator cylinder 24 via at least one sealing ring and, as a result, separates an accumulator chamber 28 which is connected hydraulically to the first working chamber 10 via the line 20 from a spring chamber 30 which contains the spring medium FM, the first working chamber 10 and the accumulator chamber 28 being filled completely here with a hydraulic medium HM. Here, the piston 6 of the spring cylinder 2 acts indirectly via the hydraulic medium HM and via the separating piston 26 against the spring medium FM within the spring chamber 30.

Figure 2:
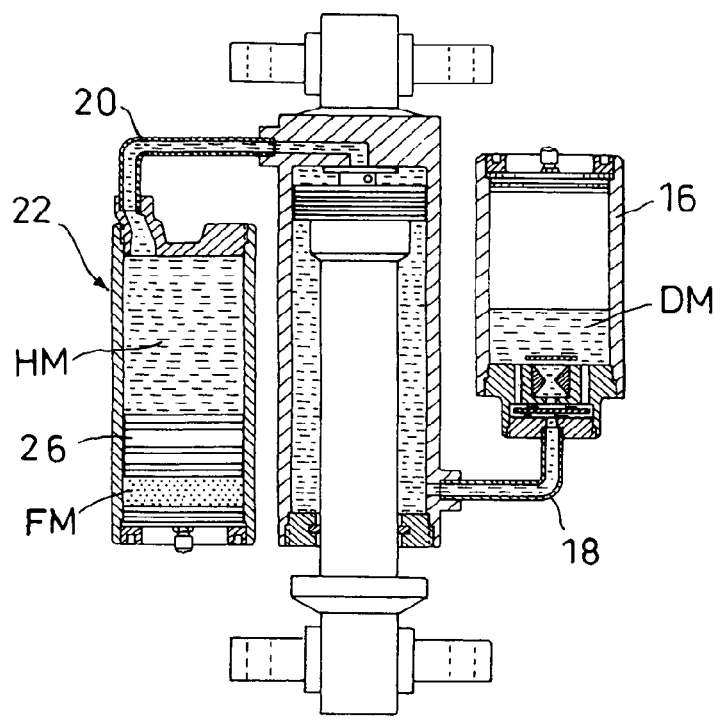
FIG. 2 shows a reduced view of the device according to FIG. 1 in a compressed state.

During compression as shown in FIG. 2, a defined volume of the hydraulic medium HM is displaced into the accumulator chamber 28 by the piston 6, as a result of which the separating piston 26 is displaced against the spring medium FM in the direction of the spring chamber 30. The pressure of the spring medium FM and thus also the supporting force F are increased by the resulting decrease in volume of the spring chamber 30.

Figure 3:
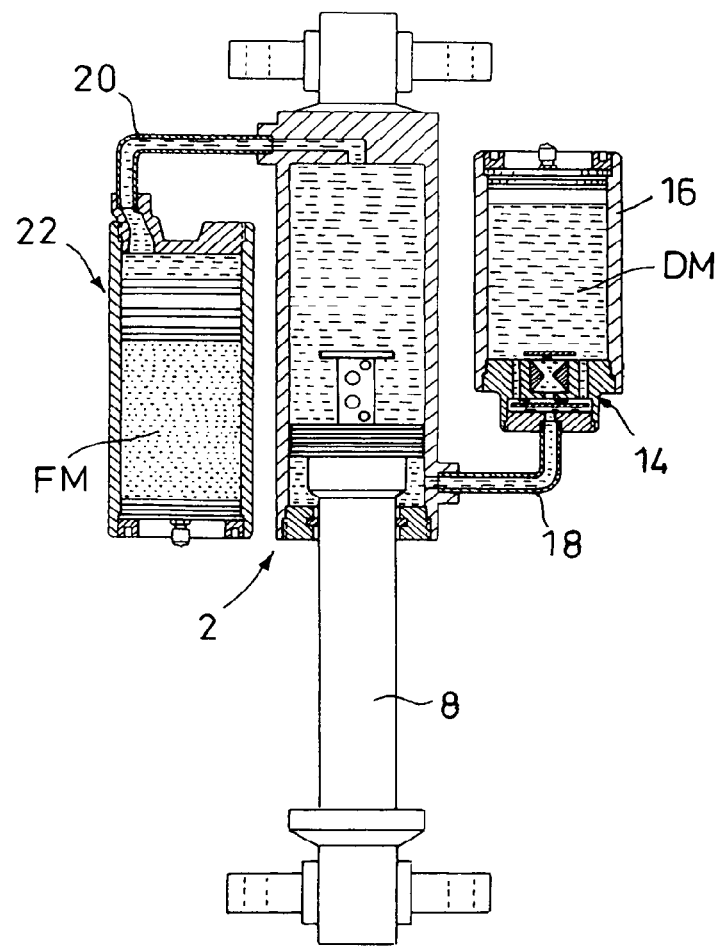
FIG. 3 shows a view which is analogous to FIG. 2, showing the device in the extended state.

In the refinement according to FIGS. 1 to 3, the separating piston 26 is arranged as a dividing wall completely within the accumulator cylinder 24. As a result, it must have a relatively great axial length, in order to avoid it tilting within the accumulator cylinder 24 and jamming as a result (what is known as the "drawer effect").

Figure 4:
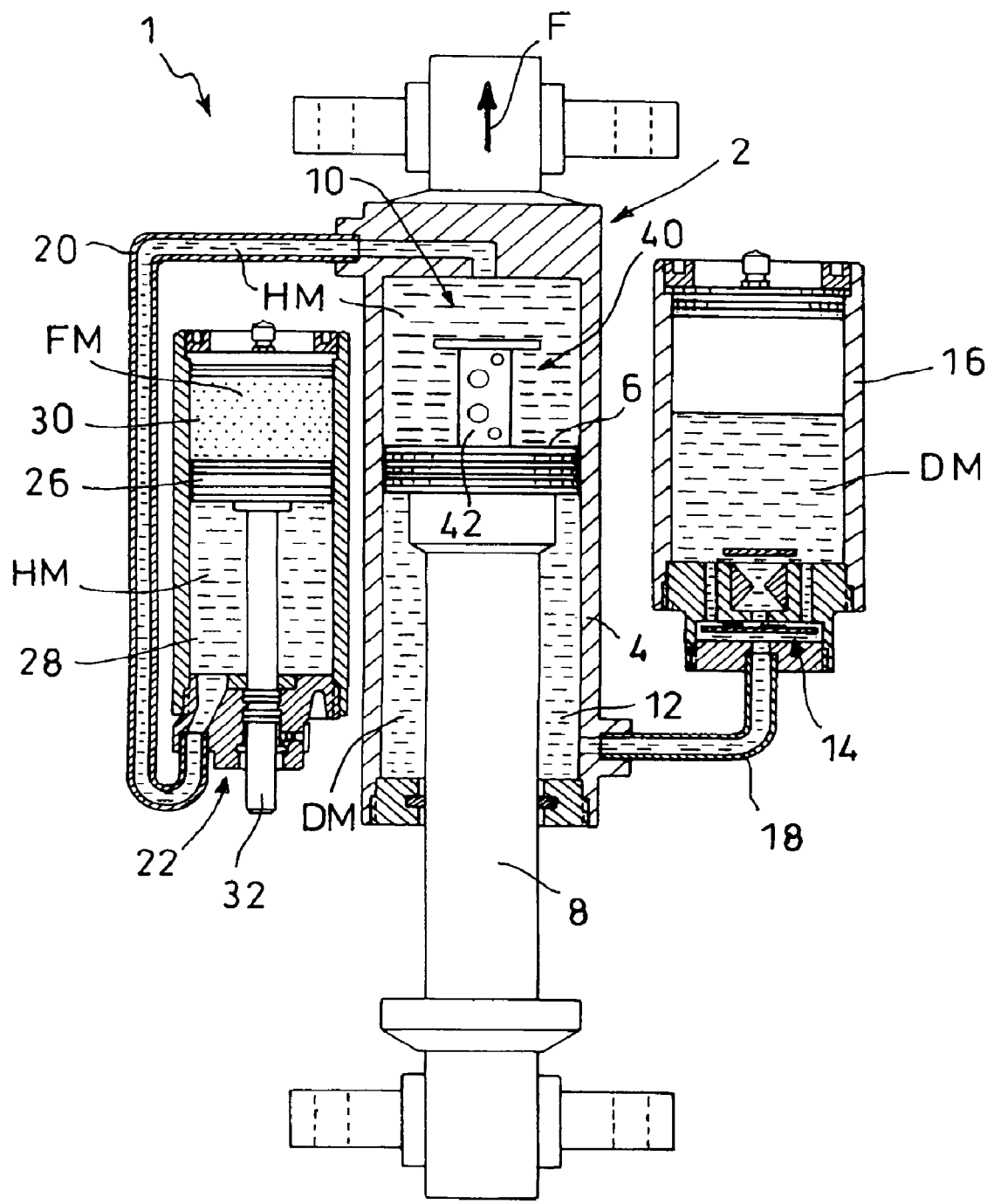
FIG. 4 shows a second embodiment of the device according to the invention in an illustration which is analogous to FIG. 1, FIGS. 5 and 6 show illustrations of the refinement according to FIG. 4, in an analogous manner to FIGS. 2 and 3, FIGS. 7 to 9 show illustrations of a third exemplary embodiment according to the invention, which are analogous to FIGS. 1 to 3 and FIGS. 4 to 6 respectively.
Figure 5:
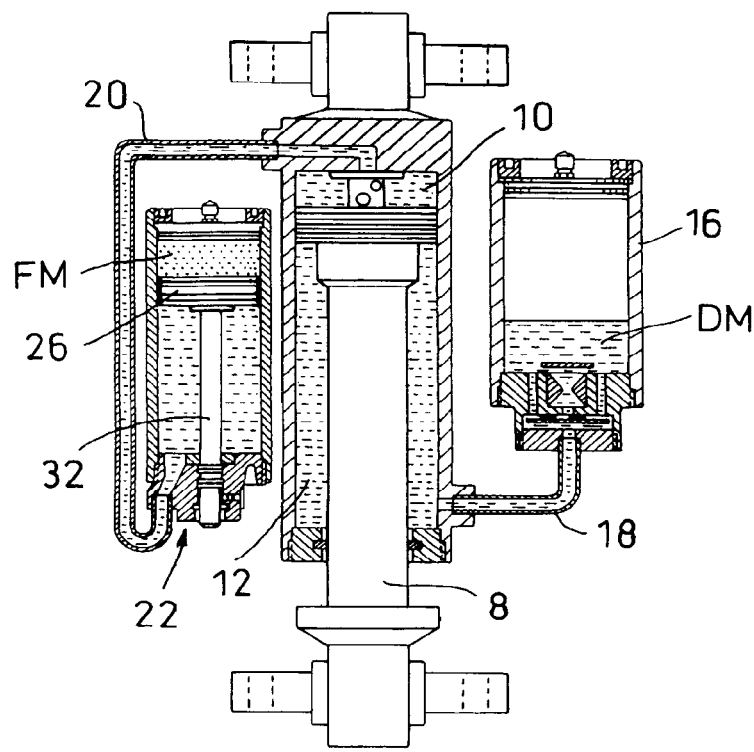
Figure 6:
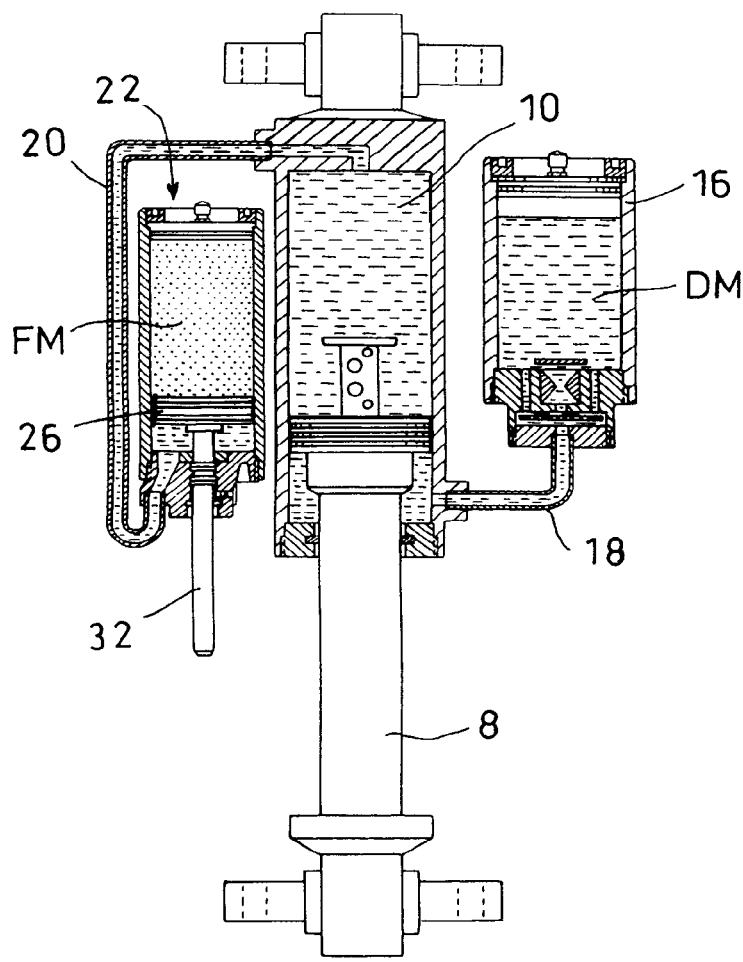

In the refinement of a suspension and damping device according to FIGS. 4 to 6, in contrast, there is provision for the separating piston 26 to have a separating piston rod 32 which extends axially through the accumulator chamber 28 and is guided outwardly out of the accumulator cylinder 24 such that it is sealed. As a result of the separating piston rod 32, firstly additional guidance of the separating piston 26 against tilting is attained, with the result that the separating piston 26 itself can be configured with a shorter axial length. As a result, the structural length of the spring force accumulator 22 can be reduced. Secondly, the spring force accumulator 22 in this refinement also acts as a pressure transducer on account of the separating piston rod 32 in such a way that the pressure of the spring medium FM is always smaller than the pressure of the hydraulic medium HM. This is attributed to the fact that those surfaces of the separating piston 26 which are acted on by pressure in each case are of different sizes. On the side of the spring chamber 30, a larger surface is acted on by the spring medium FM, with the result that a lower pressure of the spring medium FM is sufficient for a static equilibrium of the separating piston 26. In other words, the opposing pressure of the hydraulic medium HM has to be greater on account of the smaller annular surface of the separating piston 26 which encloses the separating piston rod 32, in order to hold the separating piston 26 in equilibrium.

As is shown further in FIGS. 4 to 6 and also in FIG. 11, the spring force accumulator 22 is preferably arranged in parallel next to the spring cylinder 2, to be precise in particular in an orientation, in which the piston rod 8 of the spring cylinder 2 and the separating piston rod 32 of the spring force accumulator 22 point in the same direction with in each case synchronus directions of movement. As results from the illustrations in FIGS. 5 and 6, the separating piston rod 32 moves out of the spring force accumulator 22 when the spring cylinder 2 also rebounds, that is to say when the piston rod 8 likewise moves out of the cylinder 4. As a result of this, collision problems with other vehicle components are avoided during the vehicle suspension movements.

Figure 7:
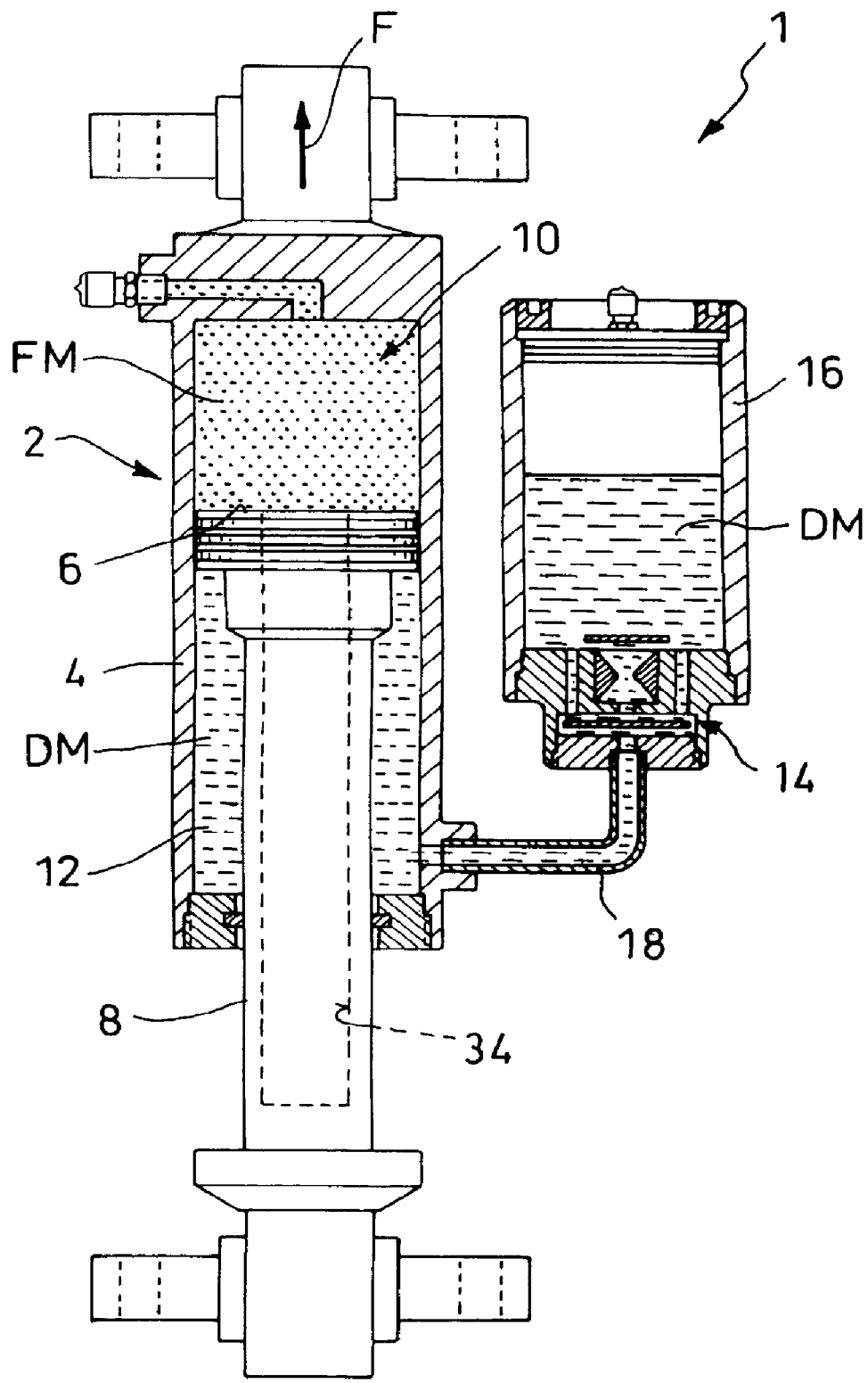
Figure 8:
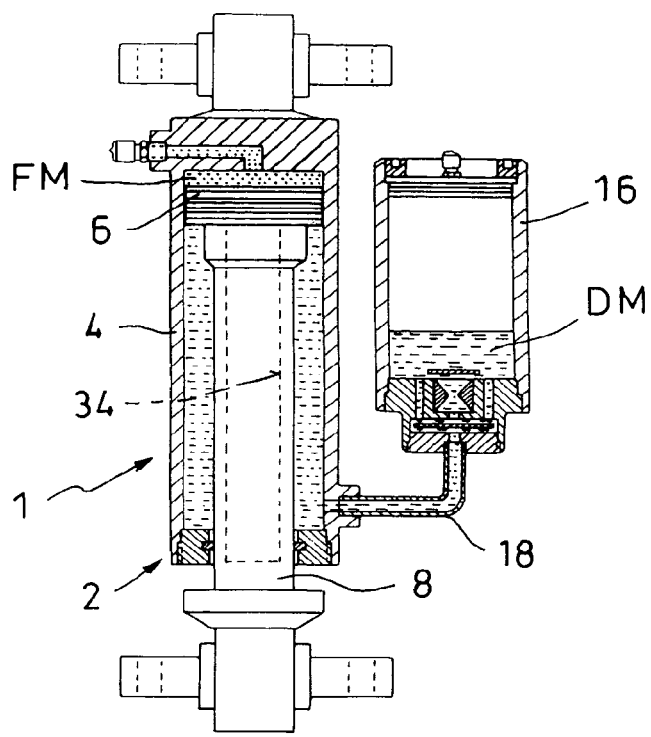
Figure 9:
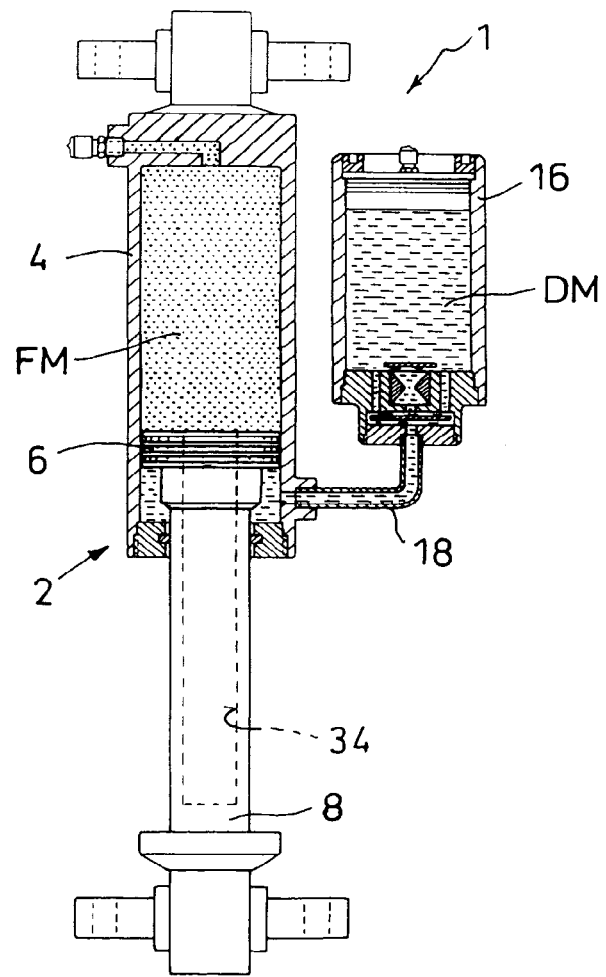

In the refinement according to FIGS. 7 to 9, the first working chamber 10 of the spring cylinder 2 is filled directly with the elastically compressible spring medium FM, with the result that the piston 6 acts directly against the spring medium FM. An additional, external spring force accumulator 22 is rendered superfluous as a result. This results in a particularly compact and lightweight overall form of the suspension and damping device 1. As, however, the compressible spring medium FM can not be compressed as desired, and in particular not down to a zero volume, a minimum residual volume is formed in this refinement by a cavity 34 within the piston 6 and the piston rod 8.

Figure 10:
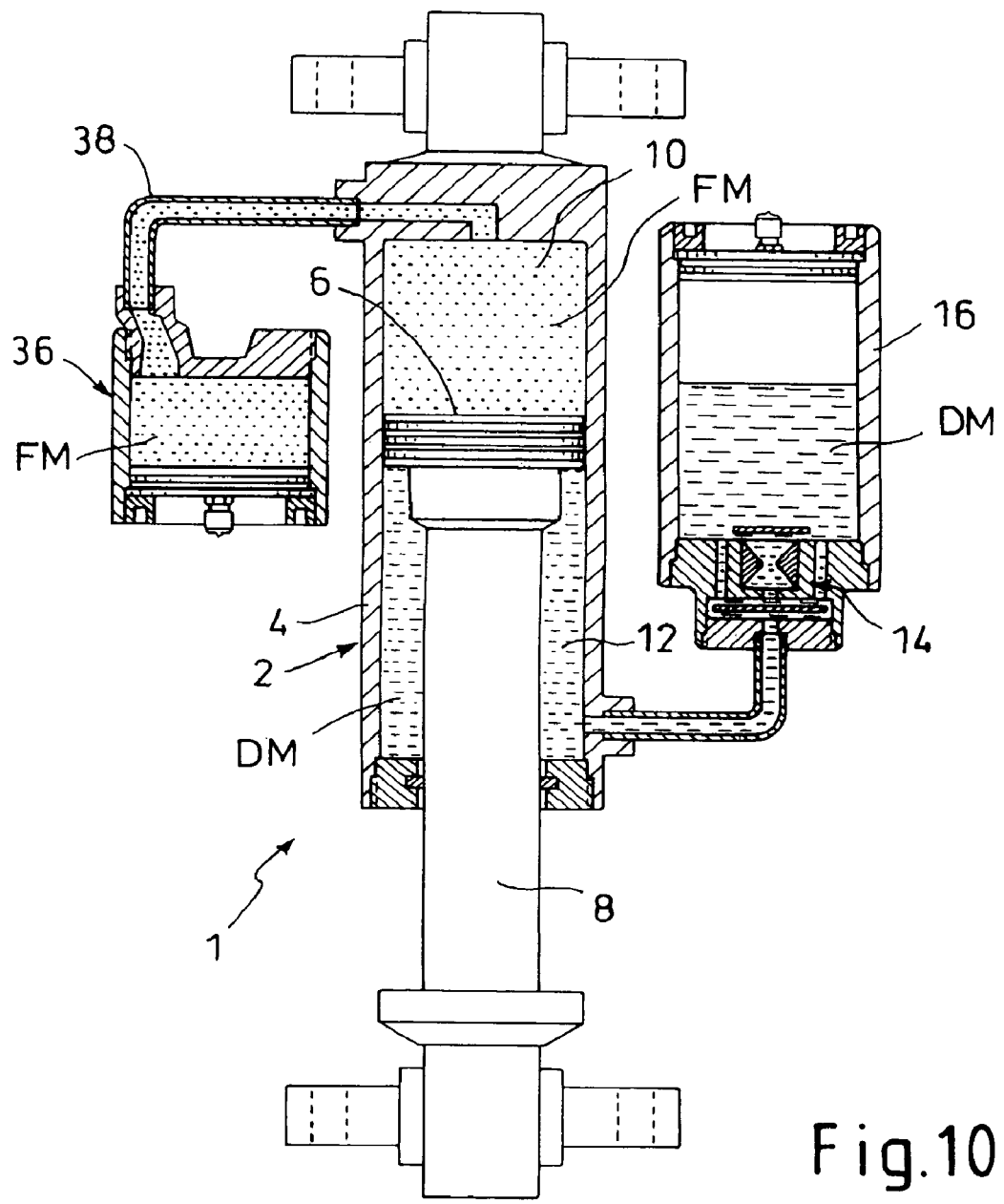
FIG. 10 shows a fourth embodiment of the invention.

As an alternative or else in addition to the cavity 34, an external additional container 36 can be connected to the first working chamber 10 via a line 38, in accordance with FIG. 10. The elastic spring medium FM is also arranged directly in the first working chamber 10 in this refinement.

In particular a gaseous medium, for example nitrogen, can be used as the compressible spring medium FM. As an alternative, any other desired medium is also suitable, for example a liquid or pasty (highly viscous) medium. A conventional, in particular low viscosity, hydraulic oil can be used as the damping medium DM and/or hydraulic medium HM.

As also results from FIGS. 1 to 6, the spring cylinder 2 is preferably equipped with a device for damping the end position hydraulically. This damper for damping the end position is denoted in each case by the designation 40 in FIGS. 1 and 4. Damper 40 for damping the end position preferably acts in the compression direction in such a way that braking of the suspension movements is ensured in each case toward the end of the compression stroke before a mechanical end stop is reached. In concrete terms, it is a distance dependent hydraulic throttling device having a plunger 42 which can be displaced telescopically into the piston 6 and which has an axial flow channel, into which a plurality of radial transverse openings which are distributed over the length open. As a result of the plunger 42 moving into the piston 6, the transverse openings are closed successively one after another during the movement as far as the end stop position. As a result, the resistance to flow is successively increased because the hydraulic medium HM can flow out only via the transverse openings and the axial channel of the plunger 42 when the plunger 42 is in mechanical contact in the region of an outflow opening of the cylinder 4 (cf. the positions in FIGS. 2 and 5). As a result, the respective movement is braked gently; a hard end stop is avoided advantageously.

Finally, FIG. 11 illustrates a hydraulic leveling device 44 which is configured in such a way that a static vehicle level provided by the suspension and samping device 1 can be changed by feeding or removing hydraulic medium HM into or from the spring circuit. For this purpose, the leveling device 44 comprises a switching valve 46, a tank 48 and a pump 50. The switching valve 46 is configured as a 3/3 way valve and is closed in the position shown. In a first switching position, the pump 50 can be connected to the suspension circuit, in order to feed in hydraulic medium and to raise the level as a result. In a second switching position, the suspension circuit is connected to the tank 48, in order to remove hydraulic medium for lowering the level.

The invention is not restricted to the exemplary embodiments which are shown and described, but also encompasses all refinements with an identical effect within the context of the invention. Furthermore, the invention is also not so far restricted to the combination of features which is described herein, but can also be defined by any other desired combination of defined features of all the individual features which have been disclosed overall.

While the above description constitutes the preferred embodiment of the present invention, it will be appreciated that the invention is susceptible to modification, variation and change without departing from the proper scope and fair meaning of the accompanying claims.

The invention claimed is:

1. A suspension and damping device for load bearing and sprung wheel support and for damping suspension movements in a motor vehicle, comprising at least one spring cylinder assembly having a piston which is guided in a spring cylinder so as to be movable relative to the spring cylinder and which acts counter to an elastically compressible spring medium of a spring medium circuit in order to generate a load bearing supporting spring force, a separate circuit of a hydraulic damping medium for damping defining a damping medium circuit and which is independent of the spring medium, wherein the piston separates the spring medium circuit from the damping medium circuit including separating a first working chamber and a second working chamber from one another within the cylinder, the first working chamber communicating with a first volume of the spring medium and the second working chamber communicating via a hydraulic line with a second volume of the damping medium in a separate hydraulic container remote from and entirely outside the cylinder, the separate hydraulic container having an inlet region with a damping valve arrangement, the piston having, on one side thereof, a piston rod connected to the piston extending outwardly out of the spring cylinder such that a seal is provided between the piston rod and the spring cylinder, with the result that the second working chamber is configured as an annular chamber which encloses the piston rod, the first working chamber being disposed adjacent a side of the piston opposite the piston rod, and filled with the elastically compressible spring medium.

2. The suspension and damping device as claimed in claim 1, wherein the piston rod is configured as a cooling element for cooling the hydraulic damping medium of the separate circuit which heats up during damping.

3. The suspension and damping device as claimed in claim 1, wherein a gaseous or liquid medium is provided as the elastically compressible spring medium.

4. The suspension and damping device as claimed in claim 1, wherein the hydraulic container is arranged parallel to the spring cylinder.

* * * * *

UNITED STATES PATENT AND TRADEMARK OFFICE
CERTIFICATE OF CORRECTION

| | | |
|---|---|---|
| PATENT NO. | : 8,151,953 B2 | Page 1 of 1 |
| APPLICATION NO. | : 12/708804 | |
| DATED | : April 10, 2012 | |
| INVENTOR(S) | : Walter Runkel | |

It is certified that error appears in the above-identified patent and that said Letters Patent is hereby corrected as shown below:

On the Title Page, Item (75)

Inventor, delete "Keubsdorf" and insert --Leubsdorf--.

Signed and Sealed this
Twelfth Day of June, 2012

David J. Kappos
*Director of the United States Patent and Trademark Office*